(12) United States Patent
Greinwald et al.

(10) Patent No.: US 11,193,544 B2
(45) Date of Patent: Dec. 7, 2021

(54) FLANGED BEARING, ASSEMBLY, AND METHOD OF MAKING AND USING THE SAME

(71) Applicant: SAINT-GOBAIN PERFORMANCE PLASTICS PAMPUS GMBH, Willich (DE)

(72) Inventors: Thomas Greinwald, Polling (DE); Rene K. Stolzenberger, Wegberg (DE); Daniel Pilz, Neuss (DE)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 0 days.

(21) Appl. No.: 16/890,247

(22) Filed: Jun. 2, 2020

(65) Prior Publication Data
US 2020/0378443 A1 Dec. 3, 2020

Related U.S. Application Data

(60) Provisional application No. 62/856,317, filed on Jun. 3, 2019.

(51) Int. Cl.
*F16C 17/10* (2006.01)
*F16C 35/04* (2006.01)
(Continued)

(52) U.S. Cl.
CPC .......... *F16C 35/045* (2013.01); *F16C 17/107* (2013.01); *F16C 27/02* (2013.01);
(Continued)

(58) Field of Classification Search
CPC ........ F16C 17/10; F16C 17/107; F16C 33/04; F16C 33/046; F16C 33/20; F16C 33/203;
(Continued)

(56) References Cited

U.S. PATENT DOCUMENTS 2,507,638 A  5/1950 Leahy
3,873,168 A * 3/1975 Viola ...................... B29C 70/08
                                                    384/298
(Continued)

FOREIGN PATENT DOCUMENTS

DE       1931671 U      1/1966
DE   102004063660 A1 *  7/2006  .............. F16C 17/10
(Continued)

OTHER PUBLICATIONS

International Search Report and Written Opinion for PCT/EP2020/065238, dated Sep. 9, 2020, 13 pages.

*Primary Examiner* — Phillip A Johnson
(74) *Attorney, Agent, or Firm* — Abel Schillinger, LLP; Chi Suk Kim

(57) ABSTRACT

A bearing including a body having a first axial end and a second axial end; and at least one flange projecting radially from the second axial end of the body, where the at least one flange includes a first region, second region, and a stepped transition region between the first and second regions, where the second region is elevated axially above the first region so as to protrude axially outwardly, where 1) the second region extends partially circumferentially around the flange to form at least one segment, and/or 2) the first region extends from the body to the stepped transition region.

19 Claims, 4 Drawing Sheets

(51) Int. Cl.
*F16C 33/10* (2006.01)
*F16C 33/04* (2006.01)
*F16C 33/20* (2006.01)
*F16C 27/02* (2006.01)

(52) U.S. Cl.
CPC ........ *F16C 33/046* (2013.01); *F16C 33/1095* (2013.01); *F16C 33/20* (2013.01); *F16C 2208/00* (2013.01); *F16C 2220/48* (2013.01); *F16C 2240/70* (2013.01)

(58) Field of Classification Search
CPC .... F16C 33/205; F16C 33/206; F16C 33/208; F16C 33/28; F16C 2208/00; F16C 2220/48; F16C 2240/70; F16C 27/02; F16C 33/1095
See application file for complete search history.

(56) References Cited

U.S. PATENT DOCUMENTS

| | | | |
|---|---|---|---|
| 5,145,265 A | 9/1992 | Flem | |
| 5,230,569 A * | 7/1993 | Sheedy | F16C 17/10 384/276 |
| 5,732,322 A * | 3/1998 | Nakamaru | F16C 33/201 428/550 |
| 5,971,617 A | 10/1999 | Woelki et al. | |
| 6,832,853 B2 | 12/2004 | Fujinaka | |
| 7,174,765 B2 | 2/2007 | Kirchhof et al. | |
| 7,731,266 B2 * | 6/2010 | Selle | F16C 11/02 296/107.01 |
| 8,944,690 B2 | 2/2015 | Natu | |
| 8,961,026 B2 | 2/2015 | Re et al. | |
| 9,022,656 B2 | 5/2015 | Burgeff et al. | |
| 9,771,973 B2 | 9/2017 | Ambroise et al. | |
| 10,087,984 B2 | 10/2018 | Hunter et al. | |
| 2011/0002565 A1 | 1/2011 | Ambroise et al. | |
| 2011/0049834 A1 | 3/2011 | Natu | |
| 2012/0240350 A1 * | 9/2012 | Natu | B62K 21/06 16/2.2 |
| 2014/0044385 A1 * | 2/2014 | Andelkovski | F16C 33/208 384/276 |
| 2016/0052438 A1 | 2/2016 | Eckendorff | |
| 2019/0093401 A1 | 3/2019 | Hoenig et al. | |

FOREIGN PATENT DOCUMENTS

| | | | |
|---|---|---|---|
| DE | 102013209922 A1 | 12/2014 | |
| DE | 202014100376 U1 | 12/2014 | |
| DE | 102014100979 B4 * | 6/2018 | ............. F16C 25/04 |
| EP | 1750034 A1 | 2/2007 | |
| EP | 2470804 A1 | 7/2012 | |
| FR | 2528922 A1 | 12/1983 | |
| WO | 9415107 A1 | 7/1994 | |

* cited by examiner

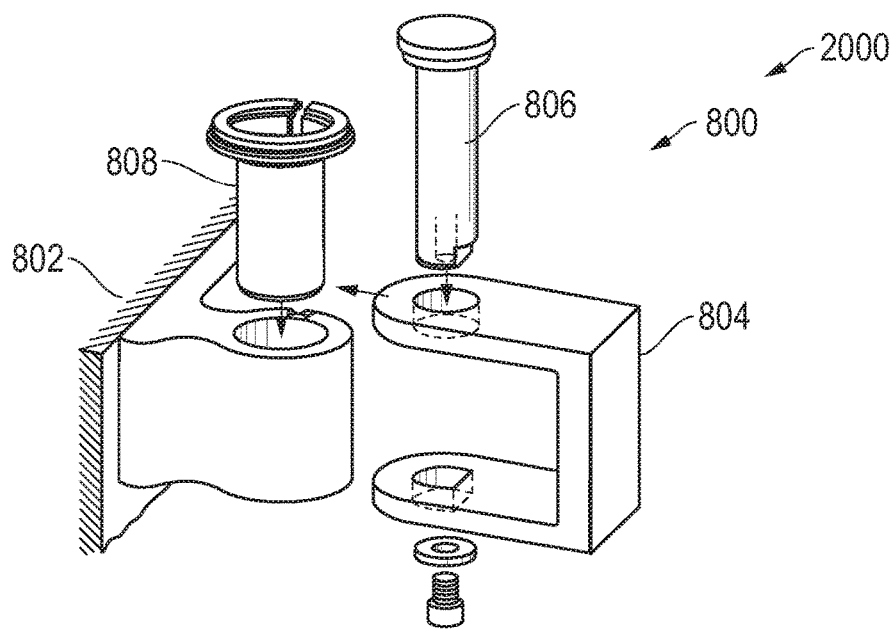
FIG. 8
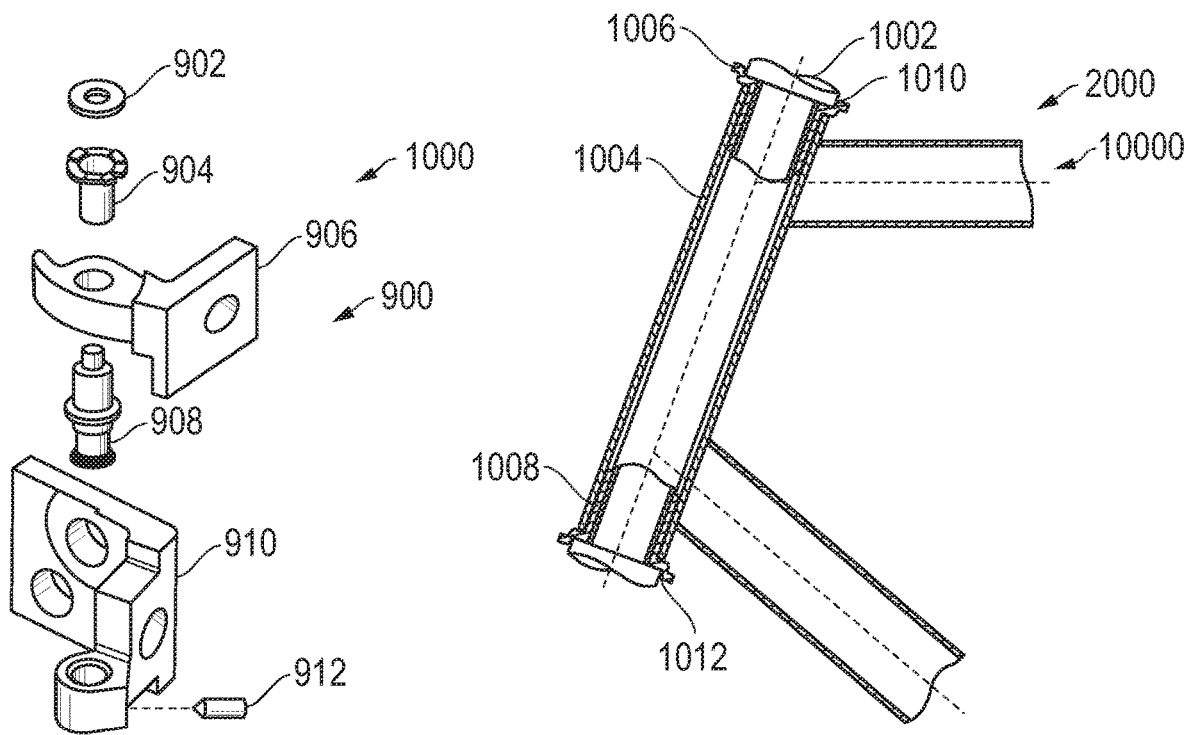
FIG. 9
FIG. 10

FLANGED BEARING, ASSEMBLY, AND METHOD OF MAKING AND USING THE SAME

CROSS-REFERENCE TO RELATED APPLICATION(S)

This application claims priority under 35 U.S.C. § 119(e) to U.S. Provisional Application No. 62/856,317, entitled "FLANGED BEARING, ASSEMBLY, AND METHOD OF MAKING AND USING THE SAME," by Thomas GREINWALD et al., filed Jun. 3, 2019, which is assigned to the current assignee hereof and incorporated herein by reference in its entirety.

FIELD OF THE DISCLOSURE

This disclosure, in general, relates to flanged bearings, in particular flanged plain bearings with at least one flange and method of production and assembly thereof.

BACKGROUND

Flanged bearings, which comprise either one or two flanges, are known in a wide range of sizes. Flanged bearings made of composite materials consisting of a substrate layer and a low friction material layer overlay are also generally known. These flanged bearings may be disposed between an inner and an outer member in an assembly. The bearing may be used in assemblies with applications in the vehicle industry, for example, for door, hood, and engine compartment hinges, seats, steering columns, flywheels, balancer shaft bearings, etc., or may be used for non-automotive applications. Despite advances in the art, there is an ongoing need for improved bearings that have a longer lifetime, improved effectiveness, and improved performance within an assembly.

BRIEF DESCRIPTION OF THE DRAWINGS

The present disclosure may be better understood, and its numerous features and advantages made apparent to those skilled in the art by referencing the accompanying drawings.

FIG. 8 is an illustration of a bearing within an assembly according to a number of embodiments;

FIG. 9 is an illustration of a bearing within an assembly according to a number of embodiments; and FIG. 10 is an illustration of a bearing within an assembly according to a number of embodiments;

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing and bearing assembly arts.

Figure 1:
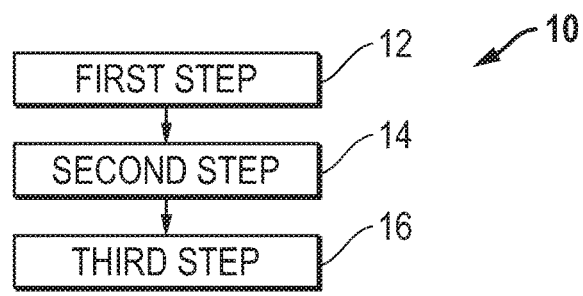
FIG. 1 is an illustration of the stepwise manufacturing process.

For purposes of illustration, FIG. 1 includes a diagram showing a manufacturing process 10 for forming a bearing. The manufacturing process 10 may include a first step 12 of providing a base material, a second step 14 of coating the base material with a low friction coating to form a composite material and a third step 16 of forming the composite material into a bearing.

Referring to the first step 12, the base material may be a substrate. In an embodiment, the substrate can at least partially include a metal support. According to certain embodiments, the metal support may include iron, copper, titanium, tin, nickel, aluminum, alloys thereof, or may be another type of metal. More particularly, the substrate can at least partially include a steel, such as, a stainless steel, carbon steel, or spring steel. For example, the substrate can at least partially include a 301 stainless steel. The 301 stainless steel may be annealed, ¼ hard, ½ hard, ¾ hard, or full hard. The substrate may include a woven mesh or an expanded metal grid. Alternatively, the woven mesh can be a woven polymer mesh using any of the polymers listed below. In an alternate embodiment, the substrate may not include a mesh or grid.

Figure 2A:
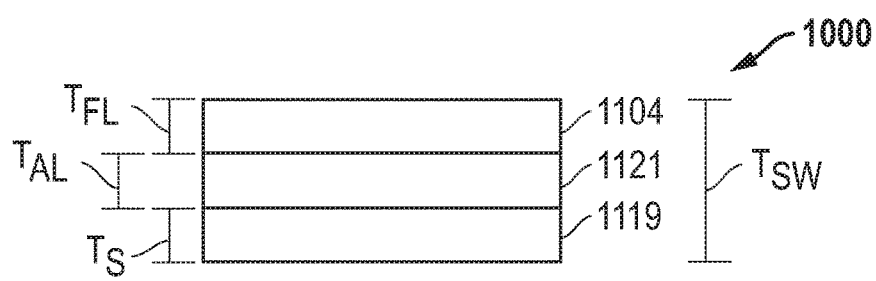
FIG. 2A is an illustration of the layer structure of a bearing according to a number of embodiments.

FIG. 2A includes an illustration of the composite material 1000 that may be processed according to first step 12 and second step 14 of the manufacturing process 10. For purposes of illustration, FIG. 2A shows the layer by layer configuration of a composite material 1000 after second step 14. In a number of embodiments, the composite material 1000 may include a substrate 1119 (i.e., the base material noted above and provided in the first step 12) and a low friction layer 1104 (i.e., the low friction coating applied in second step 14). In a number of embodiments, the substrate 1119 may extend at least partially along a length of the composite material 1000. As shown in FIG. 2A, the low friction layer 1104 can be coupled to at least a region of the substrate 1119. In a particular embodiment, the low friction layer 1104 can be coupled to a surface of the substrate 1119 so as to form a low friction interface with another surface of another component. The low friction layer 1104 can be coupled to the radially inner surface of the substrate 1119 so as to form a low friction interface with another surface of another component. The low friction layer 1104 can be coupled to the radially outer surface of the substrate 1119 so as to form a low friction interface with another surface of another component.

The substrate 1119 can have a thickness, Ts, of between about 10 microns to about 2000 microns, such as between about 50 microns and about 1500 microns, such as between about 100 microns and about 500 microns, such as between about 150 microns and about 350 microns. In a number of embodiments, the substrate 1119 may have a thickness, Ts, of between about 100 and 500 microns. In a number of embodiments, the substrate 1119 may have a thickness, Ts, of between about 200 and 350 microns. It will be further appreciated that the thickness, Ts, of the substrate 1119 may be any value between any of the minimum and maximum values noted above. The thickness of the substrate 1119 may be uniform, i.e., a thickness at a first location of the substrate 1119 can be equal to a thickness at a second location therealong. The thickness of the substrate 1119 may be non-uniform, i.e., a thickness at a first location of the substrate 1119 can be different than a thickness at a second location therealong.

In a number of embodiments, the low friction layer 1104 can include a low friction material. Low friction materials may include, for example, a polymer, such as a polyketone, a polyaramid, a polyphenylene sulfide, a polyethersulfone, a polypheylene sulfone, a polyamideimide, ultra high molecular weight polyethylene, a fluoropolymer, a polybenzimidazole, a polyacetal, polybutylene terephthalate (PBT), polyethylene terephthalate (PET), a polyimide (PI), polyetherimide, polyetheretherketone (PEEK), polyethylene (PE), a polysulfone, a polyamide (PA), polyphenylene oxide, polyphenylene sulfide (PPS), a polyurethane, a polyester, a liquid crystal polymer (LCP), or any combination thereof. In an example, the low friction layer 1104 includes polyketone, such as polyether ether ketone (PEEK), polyether ketone, polyether ketone ketone, polyether ketone ether ketone, a derivative thereof, or a combination thereof. In an additional example, the low friction layer 1104 may include an ultra high molecular weight polyethylene. In another example, the low friction layer 1104 may include a fluoropolymer including fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), or ethylene chlorotrifluoroethylene copolymer (ECTFE). The low friction layer 1104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, iron, bronze, steel, spring steel, stainless steel), a metal alloy (including the metals listed), an anodized metal (including the metals listed) or any combination thereof. Fluoropolymers may be used according to particular embodiments.

In a number of embodiments, the low friction layer 1104 may further include fillers, including glass, carbon, silicon, PEEK, aromatic polyester, bronze, fluoropolymers, thermoplastic fillers, aluminum oxide, polyamidimide (PAI), PPS, polyphenylene sulfone ($PPSO_2$), LCP, aromatic polyesters, molybdenum disulfide, tungsten disulfide, graphite, graphene, expanded graphite, boron nitride, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof. The fillers may be at least 10 wt % based on the total weight of the low friction layer, such as at least 15 wt %, 20 wt %, 25 wt % or even 30 wt %.

In an embodiment, the low friction layer 1104 can have a thickness, $T_{FL}$, of between about 1 micron to about 500 microns, such as between about 10 microns and about 400 microns, such as between about 30 microns and about 300 microns, such as between about 50 microns and about 250 microns. In a number of embodiments, the low friction layer 1104 may have a thickness, $T_{FL}$, of between about 100 and 350 microns. It will be further appreciated that the thickness, $T_{FL}$, of the low friction layer 1104 may be any value between any of the minimum and maximum values noted above. The thickness of the low friction 1104 may be uniform, i.e., a thickness at a first location of the low friction layer 1104 can be equal to a thickness at a second location therealong. The thickness of the low friction 1104 may be non-uniform, i.e., a thickness at a first location of the low friction layer 1104 can be different than a thickness at a second location therealong. The low friction layer 1104 may overlie one major surface of the substrate 1119, shown, or overlie both major surfaces. The substrate 1119 may be at least partially encapsulated by the low friction layer 1104. That is, the low friction layer 1104 may cover at least a region of the substrate 1119. Axial surfaces of the substrate 1119 may or may not be exposed from the low friction layer 1104.

In an embodiment, the composite material 1000 may also include at least one adhesive layer 1121 that may couple the low friction layer 1104 to the substrate 1119 (i.e., the base material provided in the first step 12) and a low friction layer 1104 (i.e., the low friction coating applied in second step 14). In another alternate embodiment, the substrate 1119, as a solid component, woven mesh or expanded metal grid, may be embedded between at least one adhesive layer 1121 included between the low friction layer 1104 and the substrate 1119.

The adhesive layer 1121 may include any known adhesive material common to the bearing arts including, but not limited to, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C.

In an embodiment, the adhesive layer 1121 can have a thickness, $T_{AL}$, of between about 1 micron to about 100 microns, such as between about 5 microns and about 80 microns, such as between about 10 microns and about 50 microns, such as between about 20 microns and about 40 microns. In a number of embodiments, the adhesive layer 1121 may have a thickness, $T_{AL}$, of between about 15 and 60 microns. In a number of embodiments, the adhesive layer 1121 may have a thickness, $T_{AL}$, of between about 30 and 100 microns. It will be further appreciated that the thickness, $T_{AL}$, of the adhesive layer 1121 may be any value between any of the minimum and maximum values noted above. The thickness of the adhesive layer 1121 may be uniform, i.e., a thickness at a first location of the adhesive layer 1121 can be equal to a thickness at a second location therealong. The thickness of the adhesive layer 1121 may be non-uniform, i.e., a thickness at a first location of the adhesive layer 1121 can be different than a thickness at a second location therealong.

Figure 2B:
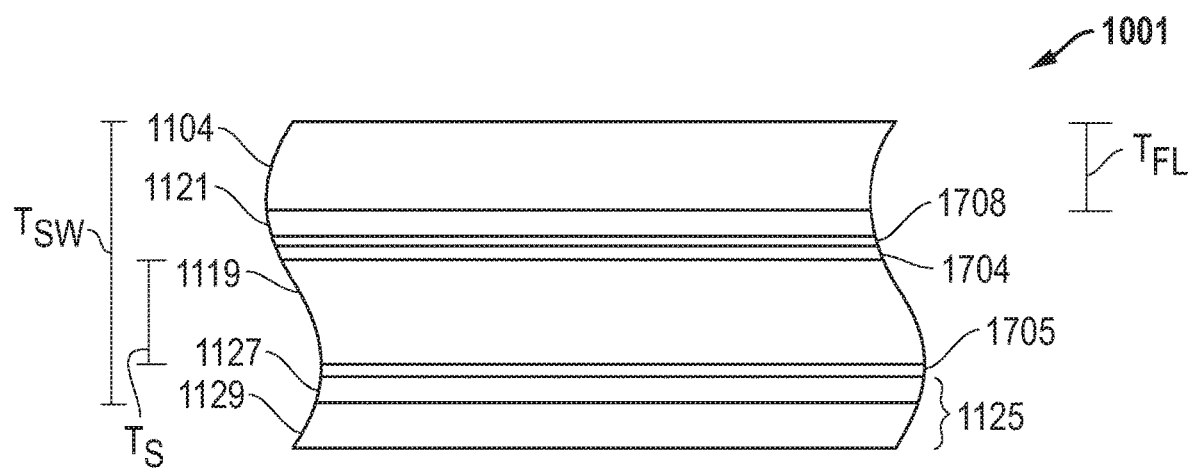
FIG. 2B is an illustration of the layer structure of a bearing according to a number of embodiments.

FIG. 2B includes an illustration of another embodiment. For purposes of illustration, FIG. 2B shows the layer by layer configuration of a composite material 1001 after second step 14. According to this particular embodiment, the composite material 1001 may be similar to the composite material 1000 of FIG. 2A, except this composite material 1001 may also include corrosion protection layers 1704, 1705, and 1708, and a corrosion resistant layer 1125 that can include an adhesion promoter layer 1127 and an epoxy layer 1129 that may couple to the substrate 1119 (i.e., the base material provided in the first step 12) and a low friction layer 1104 (i.e., the low friction coating applied in second step 14).

The substrate 1119 may be coated with corrosion protection layers 1704 and 1705 to prevent corrosion of the substrate 1119 prior to processing. Additionally, a corrosion protection layer 1708 can be applied over layer 1704. Each of layers 1704, 1705, and 1708 can have a thickness of about 1 to 50 microns, such as about 7 to 15 microns. Layers 1704 and 1705 can include aluminum, zinc, magnesium, nickel, tin or any alloy thereof, a phosphate of zinc, iron, manganese, or any combination thereof, or a nano-ceramic layer. Further, layers 1704 and 1705 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 1708 can include functional silanes, nano-scaled silane based primers, hydrolyzed silanes, organosilane adhesion promoters, solvent/water based silane primers. Corrosion protection layers 1704, 1706, and 1708 can be removed or retained during processing.

As stated above, the composite material 1001 may further include a corrosion resistant layer 1125. The corrosion resistant layer 1125 can have a thickness of about 1 to 50 microns, such as about 5 to 20 microns, and such as about 7 to 15 microns. The corrosion resistant layer 1125 can include an adhesion promoter layer 1127 and an epoxy layer 1129. The adhesion promoter layer 1127 can include a phosphate of zinc, iron, manganese, tin, or any combination thereof, or a nano-ceramic layer. The adhesion promoter layer 1127 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The epoxy layer 1129 can be a thermal cured epoxy, a UV cured epoxy, an IR cured epoxy, an electron beam cured epoxy, a radiation cured epoxy, or an air cured epoxy. Further, the epoxy layer 1129 can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy layer 1129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_XH_YX_ZA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof. Generally, amines can be primary amines, secondary amines, or tertiary amines conforming to the formula $R_1R_2R_3N$ where R can be $C_XH_YX_ZA_U$ as described above. In an embodiment, the epoxy layer 1129 can include fillers to improve the conductivity, such as carbon fillers, carbon fibers, carbon particles, graphite, metallic fillers such as bronze, aluminum, and other metals and their alloys, metal coated carbon fillers, metal coated polymer fillers, or any combination thereof. The conductive fillers can allow current to pass through the epoxy coating and can increase the conductivity of the coated bearing as compared to a coated bearing without conductive fillers.

In an embodiment, the composite material 1000, 1001 can have a thickness, $T_{SW}$, in a range of 0.1 mm and 5 mm, such as in a range of 0.15 mm and 2.5 mm, or even in a range of 0.2 mm and 1.5 mm. It will be further appreciated that the thickness, $T_{SW}$ of the composite material 1000, 1001 may be any value between any of the minimum and maximum values noted above. The thickness, $T_{SW}$ of the composite material 1000, 1001 may be uniform, i.e., a thickness at a first location of the composite material 1000, 1001 can be equal to a thickness at a second location therealong. The thickness, $T_{SW}$ of the composite material 1000, 1001 may be non-uniform, i.e., a thickness at a first location of the composite material 1000, 1001 can be different than a thickness at a second location therealong.

In an embodiment, under step 14 of FIG. 1, any of the layers on the composite material 1000, 1001 as described above, can each be disposed in a roll and peeled therefrom to join together. Joining may be done under pressure, and optionally at elevated temperatures (e.g., pressed), and with an adhesive. Any of the layers of the composite material 1000, 1001 as described above, may be laminated together such that they at least partially overlap one another. The sheet may be formed into a substrate 1119 having radial inner and outer surfaces. A low friction layer 1104 may encapsulate the substrate 1119 such that at least one of the radial inner and outer surfaces of the substrate 1119 may be located within the low friction layer 1104.

Referring now to the third step 16 of the manufacturing process 10 as shown in FIG. 1, according to certain embodiments, forming the composite material 1000, 1001 into a bearing may include gluing the low friction layer 1104 or any intervening layers can to the substrate 1119 using a melt adhesive 1121 to form a laminate. The laminate can be cut into blanks that can be formed into the bearing. The cutting of the laminate into a blank may include use of a stamp, press, punch, saw, deep drawing, or may be machined in a different way. Cutting the laminate into a blank can create cut edges including an exposed region of the substrate 1119. The blanks can be formed into the bearing, such as by rolling and flanging the laminate to form a semi-finished bearing of a desired shape. The forming of the bearing from the blank may include use of a stamp, press, punch, saw, deep drawing, or may be machined in a different way. In some embodiments, the edges of the blank may be bent into a flange in a secondary operation. In other embodiments, the bearing may be formed through a single operation process including forming the flange. The bearing may be formed as a single unit or unitary piece of material.

Figure 3A:
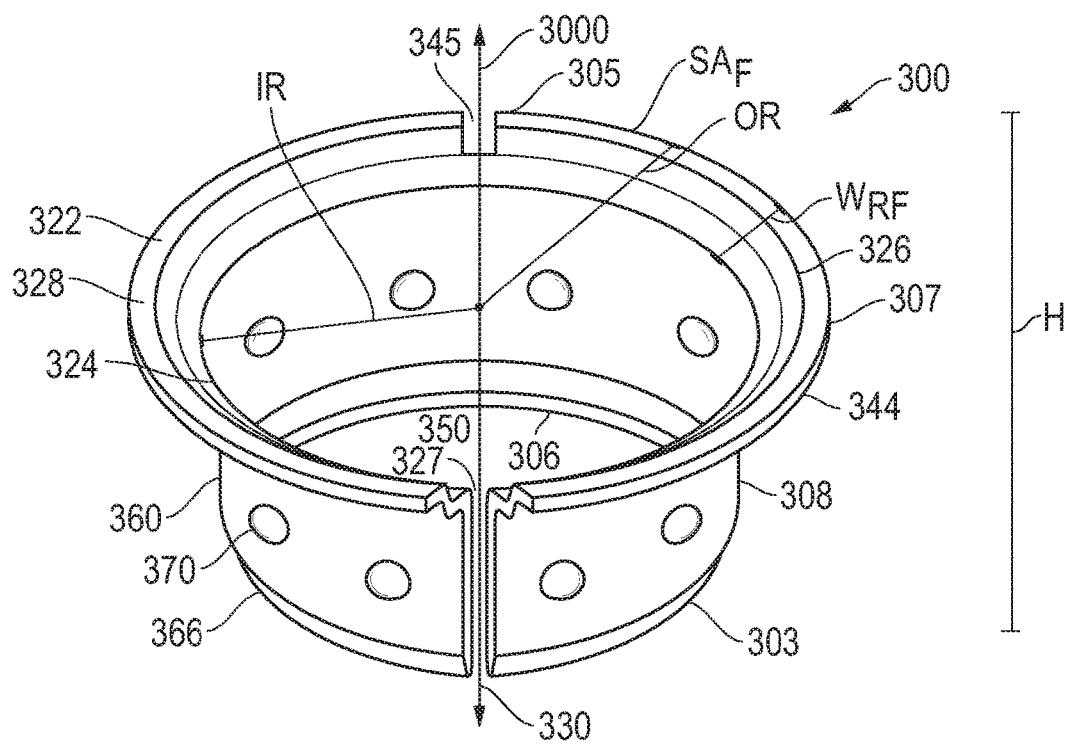
FIG. 3A is an illustration of a perspective top view of bearing according to a number of embodiments.
Figures 3B, 4:
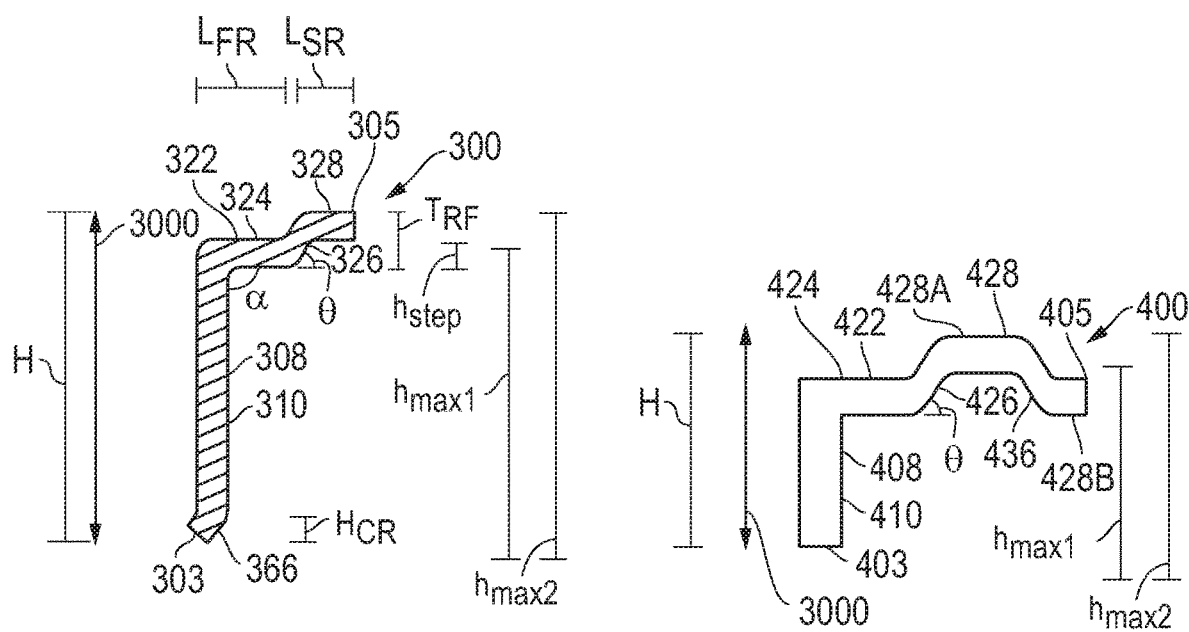
FIG. 3B is an illustration of a radial cross-sectional view of a bearing according to a number of embodiments.
FIG. 4 is an illustration of a radial cross-sectional view of a bearing according to a number of embodiments.
Figure 5:
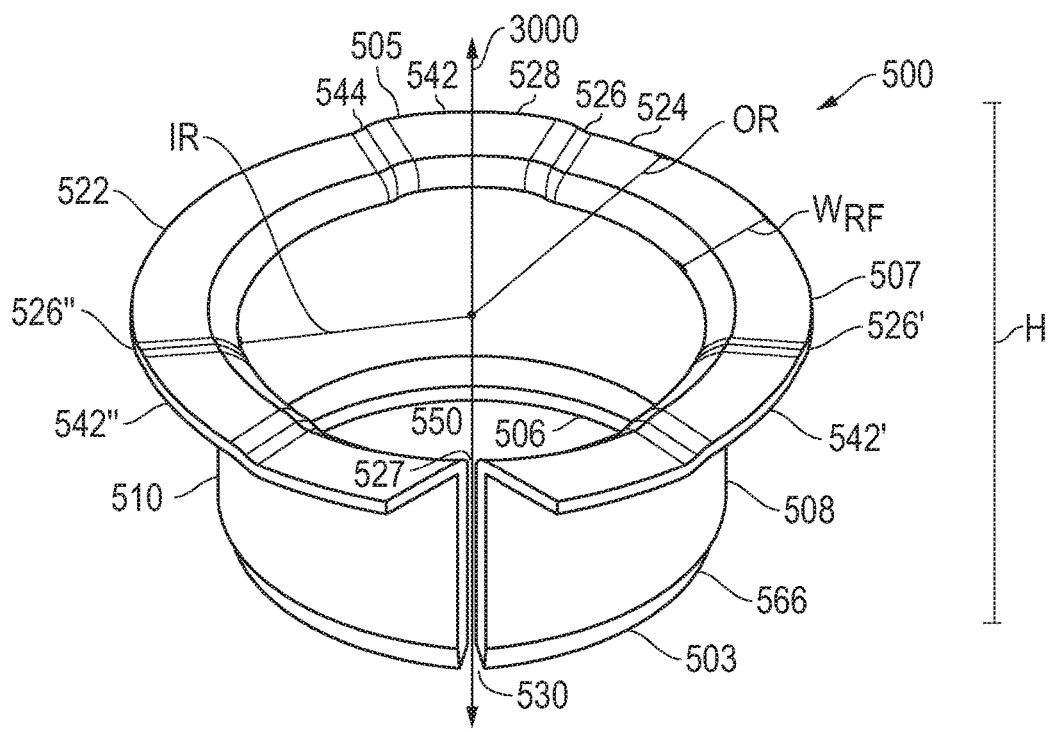
FIG. 5 is an illustration of a perspective top view of a bearing according to a number of embodiments.

For purposes of illustration, FIGS. 3A-5 illustrate a number of bearing embodiment shapes (generally designated 300, 400, and 500) that can be formed from the blanks. In a number of embodiments, the bearing 300, 400, 500 shown in FIGS. 3A-5 may be produced by rolling of an appropriately dimensioned piece of composite material 1000, 1001 which may be initially present as a blank as described above. FIG. 3A illustrates a top perspective view of a bearing 300 that can be formed as described by the forming process above. FIG. 3B illustrates a radial cross-sectional view of a bearing 300 that can be formed as described by the forming process above. FIG. 4 illustrates a radial cross-sectional view of a bearing 400 that can be formed as described by the forming process above. FIG. 5 illustrates a top perspective view of a bearing 500 that can be formed as described by the forming process above.

Referring now to FIGS. 3A-3B, in a number of specific embodiments, the bearing may be a plain bearing 300. In a number of embodiments, the bearing 300 may be a sliding bearing. The bearing 300 may extend in the axial direction relative to a central axis 3000. The central axis 3000 is oriented longitudinally extending along the length of the bearing 300. The bearing 300 may include a bearing sidewall 308. The sidewall 308 may include a body 310 that may form an annular shape having a first axial end 303 and a second axial end 305, as viewed in longitudinal cross-section. The bearing may have an outer radial end 307 and an inner radial end 306. The bearing 300 may have an annular shape that is substantially L shaped. In other words, the bearing 300 may have an L bearing cross-section extending in the radial and axial direction as shown in FIG. 3B.

Other annular shapes of the bearing are possible. The opposite ends of a rolled piece of the composite material 1000, 1001 forming the bearing 300 may be bound at an axial gap 330 that extends in the axial direction along the body 310. Axial gaps 330 extending nonlinearly and/or obliquely to the central axis 3000 of the bearing 300 are also possible. In a number of particular embodiments, the axial gap 330 may be welded or otherwise coupled by other means to form a closed bearing 300. In some embodiments, the axial gap 330 may be left uncoupled. The bearing 300 may include a bore 350 extending down the axial length of the bearing 300 and adapted to house an internal component of an assembly. The bore 350 may be parallel to the central axis 3000. The bore 350 may be formed by bending a planar composite material 1000, 1001 into a generally cylindrical shape.

The bearing 300 sidewall 308 may further include at least one flange 322. As shown in FIGS. 3A-3B, the flange 322 may project radially outwardly from at least one of the first axial end 303 or the second axial end 305. Alternatively, the flange 322 may project radially inwardly from at least one of the first axial end 303 or the second axial end 305. The flange 322 may extend from the inner radial end 306 to the outer radial end 307. Alternatively, the flange 322 may extend from the outer radial end 307 to the inner radial end 306. In some embodiments, the flange 322 may be positioned at the second axial end 305 of the bearing 300. In a number of embodiments, the outer radial end 307 may form the outer radius OR of the bearing 300 when measured radially from the central axis 3000. In a number of embodiments, the inner radial end 306 may form the inner radius IR of the bearing 300 when measured radially from the central axis 3000. In other words, a radial width of the flange 322 $W_{RF}$ may be the distance from the difference in distance of the outer radius OR and the inner radius IR. In a number of embodiments, the flange 322 may include an axial split 327. The axial split 327 may provide a gap in the flange 322. In certain embodiments, as shown in FIGS. 3A-3B, the axial split 327 can be contiguous with the axial gap 330 in the body 310. In other embodiments, the axial split 327 can be non-contiguous with the axial gap 330 in the body 310. In a number of embodiments, as shown in FIG. 3A, the flange 322 may include a plurality of axial splits 327, 345 to form a segmented flange 322.

In a number of embodiments, as shown in FIGS. 3A-3B, the bearing 300 may have an overall inner radius, IR, from the central axis 3000 to the inner radial end 306, and IR can be ≥1 mm, such as ≥5 mm, ≥10 mm, ≥15 mm, ≥20 mm, or ≥50 mm. The inner radius IR can be ≤50 mm, such as ≤20 mm, ≤15 mm, ≤10 mm, ≤5 mm, or ≤1 mm. The inner radius IR may vary along the circumference of the bearing 300. In a number of embodiments, the bearing 300 can have an overall inner radius, IR, of between about 3 to 50 mm. It will be appreciated that the bearing 300 can have an overall inner radius, IR, which may be within a range between any of the minimum and maximum values noted above. It will be further appreciated that the bearing 300 can have an overall inner radius, IR, which may be any value between any of the minimum and maximum values noted above.

In a number of embodiments, as shown in FIGS. 3A-3B, the bearing 300 may have an overall outer radius, OR, from the central axis 3000 to the outer radial end 307, and OR can be ≥1.5 mm, such as ≥5 mm, ≥10 mm, ≥20 mm, ≥40 mm, or ≥70 mm. The outer radius OR can be ≤80 mm, such as ≤50 mm, ≤30 mm, ≤20 mm, ≤10 mm, or ≤5 mm. The overall outer radius, OR, may vary along the circumference of the bearing 300. In a number of embodiments, the bearing 300 can have an overall outer radius, OR, of between about 5 to 60 mm. It will be appreciated that the bearing 300 can have an overall outer radius, OR, that may be within a range between any of the minimum and maximum values noted above. It will be further appreciated that the bearing 300 can have an overall outer radius, OR, that may be any value between any of the minimum and maximum values noted above. Further, as stated above, the radial width of the flange 322, $W_{RF}$, may be the distance from the difference in distance of the outer radius OR and the inner radius IR.

In a number of embodiments, as shown in FIGS. 3A-3B, the bearing 300 can have an overall height, H, from first axial end 303 to the second axial end 305, and H can be ≥0.5 mm, 0.75 mm, ≥1 mm, ≥2 mm, ≥5 mm, ≥10 mm, or ≥50 mm. The height, H, can be ≤500 mm, such as ≤250 mm, ≤150 mm, ≤100 mm, or ≤50 mm. In a number of embodiments, the bearing 300 can have an overall height, H, of between about 5 to 50 mm. It will be appreciated that the bearing 300 can have an overall height, H, which may be within a range between any of the minimum and maximum values noted above. It will be further appreciated that the bearing 300 can have an overall height, H, which may be any value between any of the minimum and maximum values noted above.

In a number of embodiments, as shown in FIGS. 3A-3B, the at least one flange 322 may project radially outwardly from the second axial end 305 of the body 310 of the bearing 300. In an embodiment, the flange 322 may be positioned to project orthogonal to the body 310. In other embodiments, the flange 322 may be positioned to project non-orthogonal to the body 310. In some embodiments, the flange 322 may form an angle α with the body 310 (and the central axial 3000). Angle α may be in a range from at least 0° to 180°. The angle α may be 30° or greater, such as 45° or greater, 55° or greater, or 85° or greater. The angle α may be 150° or less, such as 135° or less, 120° or less, 90° or less, or 60° or less. In a number of specific embodiments, the angle α may be in a range of 60° to 120°.

In a number of embodiments, as shown in FIGS. 3A-3B, the flange 322 may include first region 324, second region 328, and a stepped transition region 326 between the first and second regions, 324, 328. In a number of embodiments, the second region may be elevated axially above the first region so as to protrude axially outwardly. The stepped transition region 326 may form an inclined angle θ relative to a line parallel to the central axis, where the inclined angle θ is in a range from about 10° to about 90°. The angle θ may be 10° or greater, such as 25° or greater, 35° or greater, or 45° or greater. The angle θ may be 85° or less, such as 75° or less, 65° or less, 55° or less, or 50° or less. In a number of specific embodiments, the angle θ may be in a range of 30° to 90°. In a number of embodiments, the second region 328 and/or stepped transition region 326 may be adapted to at least partially axially deform so as to provide axial tolerance compensation. Specifically, the second region provides a compressive force of X (N).

In a number of embodiments, as shown in FIG. 3B, the flange 322 can have a thickness, $T_{RF}$, of between about 0.5 mm to about 10 mm, such as between about 0.75 mm and about 8 mm, such as between about 1 mm and about 5 mm, such as between about 1.5 mm and about 4 mm. In a number of embodiments, the flange 322 can have a thickness, $T_{RF}$, of between about 0.7 to 5 mm. It will be appreciated that the flange 322 can have a thickness, $T_{RF}$, which may be within a range between any of the minimum and maximum values noted above. It will be further appreciated that the flange 322 can have a thickness, $T_{RF}$, which may be any value between any of the minimum and maximum values noted above. It may also be appreciated that the thickness, $T_{RF}$, of the flange 322 may vary around the circumference of the bearing 300.

In a number of embodiments, as shown in FIG. 3B, the height of the stepped transition region 326, $h_{step}$, can be ≥0.15 mm, ≥0.25 mm, ≥0.5 mm, ≥1 mm, ≥2 mm, or ≥5 mm. The height the stepped transition region 326, $h_{step}$, can be ≤10 mm, such as ≤7.5 mm, ≤5 mm, ≤2.5 mm, or ≤1 mm. It will be appreciated that the height of the stepped transition region 326, $h_{step}$, may be within a range between any of the minimum and maximum values noted above. It will be further appreciated that the height of the stepped transition region 326, $h_{step}$, may be any value between any of the minimum and maximum values noted above. It may also be appreciated that the height of the stepped transition region 326, $h_{step}$, may vary around the circumference of the bearing 300.

The stepped transition region 326 may extend a total thickness, $T_{RF}$, of the flange 322 by at least 50% and not greater than 400%, such as at least 70% and not greater than 500%, at least 85% and not greater than 400%, or at least 100% and not greater than 300%, based on a thickness of the flange having no step included. The stepped transition region 326 may increase the thickness of the flange 322 by at least 0.1 mm.

In a number of embodiments, as shown in FIG. 3B and as viewed in radial cross-section, the first region 324 may have a radial length, $L_{FR}$, and second region 328 may have radial length, $L_{SR}$, where, $L_{FR} > L_{SR}$, such as 0.9 $L_{FR} > L_{SR}$, 0.8 $L_{FR} > L_{SR}$, 0.75 $L_{FR} > L_{SR}$, or 0.5 $L_{FR} > L_{SR}$ or where, $L_{FR} < L_{SR}$, such as 0.9 $L_{FR} < L_{SR}$, 0.8 $L_{FR} < L_{SR}$, 0.75 $L_{FR} < L_{SR}$, or 0.5 $L_{FR} < L_{SR}$.

In a number of embodiments, as shown in FIG. 3A, the flange 322 may have a surface area, $SA_F$, and the second region 328 extends less than 80% of the surface area, $SA_F$, of the flange 322, such less than 75% of the surface area, $SA_F$, less than 60% of the surface area, $SA_F$, less than 50% of the surface area, $SA_F$ or even less than 30% of the surface area, $SA_F$.

In a number of embodiments, as shown in FIGS. 3A-3B, the stepped transition region 326 may be annular around the circumference of the flange 322. In this embodiment, the first region 324 may extend from the body to the stepped transition region and defines a maximum first axial height, $h_{max1}$, defined as the distance from the first axial end to the maximum height of the first region, and the second region extending from the stepped transition region defines a second maximum axial height, $h_{max2}$, defined as the distance from the first axial end to the maximum height of the second region, and where $h_{max1} < h_{max2}$. In a number of embodiments, $h_{max1} \leq 0.99\ h_{max2}$, such as $h_{max1} \leq 0.95\ h_{max2}$, or $h_{max1} \leq 0.90\ h_{max2}$.

In a number of embodiments, as shown in FIG. 3A, the sidewall 308 or body 310 may include at least one protrusion 370, which may be oriented in the radial direction. The at least one protrusion 370 may provide more stiffness for the body 310 or the flange 322. In a number of embodiments, the protrusion 370 may provide radial tolerance compensation and stiffness support for at least one of the body 310 or the flange 322. The protrusion 370 may include at least one undulation, depression, groove, trough, plateau, ramp, projection, or deformation in the radial direction. The protrusion 370 may be oriented radially outward or radially inward from a line parallel to the central axis 3000. The protrusion 370 may have a circular, polygonal, oval, or semi-circular cross-sectional shape. In a number of embodiments, the protrusion 370 may be located on the body 310. In a number of embodiments, the protrusion 370 may be disposed in the axial distance between the first axial end 303 and the second axial end 305. In a number of embodiments, the protrusion 370 may be at the first axial end 303 or the second axial end 305. In other words, the protrusion 370 may extend anywhere along the circumference of the body 310. In an embodiment, the protrusion 370 may be on the flange 322. The forming of the protrusion 370 may include use of a stamp, press, punch, saw, deep drawing, or may be machined in a different way.

The protrusion 370 may have a width $W_P$. The width $W_P$ may have a relationship with the radial width of the flange 322, $W_{RF}$, of the bearing 300 such that $H_{CR} \geq 0.3\ W_{RF}$, such as $\geq 0.25\ W_{RF}$, $\geq 0.20\ W_{RF}$, $\geq 0.15\ W_{RF}$, $\geq 0.10\ W_{RF}$, or $\geq 0.05\ W_{RF}$. In another aspect, width $W_P$ can be $\leq 0.5\ W_{RF}$, such as $\leq 0.45\ W_{RF}$, $\leq 0.40\ W_{RF}$, $\leq 0.35\ W_{RF}$, $\leq 0.30\ W_{RF}$, $\leq 0.25\ W_{RF}$, $\leq 0.20\ W_{RF}$, $\leq 0.15\ W_{RF}$, $\leq 0.10\ W_{RF}$, or $\leq 0.05\ W_{RF}$. The width $W_P$ of different protrusions 370 may vary along the circumference of the bearing 300 about the central axis 3000.

In a number of embodiments, as shown in FIGS. 3A-3B, the body 310 may include at least one coining region 366, which may be oriented in the radial direction. The at least one coining region 366 may provide more stiffness for the body 310 or the flange 322. In a number of embodiments, the coining region 366 may provide axial tolerance compensation and stiffness support for at least one of the body 310 or the flange 322. The coining region 366 may include at least one undulation, depression, groove, trough, plateau, ramp, projection, or deformation in the axial direction. The coining region 366 may have a circular, polygonal, oval, or semi circular cross-sectional shape. In a number of embodiments, the coining region 366 may be located on the body 310. In a number of embodiments, the coining region 366 may be disposed in the axial distance between the first axial end 303 and the second axial end 305. In a number of embodiments, the coining region 366 may be at the first axial end 303 or the second axial end 305. In other words, the coining region 366 may extend anywhere along the circumference of the body 310. In one embodiment, the coining region 366 may be in the shape of a deformation in a radial direction so the body 310 may be non-parallel to the central axis 3000 of the bearing 300 as shown in FIG. 3A. The coining region 366 may be deformed radially outward or radially inward from a line parallel to the central axis 3000. The forming of the coining region 366 may include use of a stamp, press, punch, saw, deep drawing, or may be machined in a different way.

As shown best in FIG. 3B, the coining region 366 may have a height $H_{CR}$. The height $H_{CR}$ may have a relationship with the height H of the bearing 300 such that $H_{CR} \geq 0.3\ H$, such as $\geq 0.25\ H$, $\geq 0.20\ H$, $\geq 0.15\ H$, $\geq 0.10\ H$, or $\geq 0.05\ H$. In another aspect, height $H_{CR}$ can be $\leq 0.5H$, such as $\leq 0.45H$, $\leq 0.40H$, $\leq 0.35H$, $\leq 0.30H$, $\leq 0.25H$, $\leq 0.20H$, $\leq 0.15H$, $\leq 0.10\ H$, or $\leq 0.05\ H$. The height $H_{CR}$ of the coining region 366 may vary along the circumference of the bearing 300 about the central axis 3000.

FIG. 4 illustrates a radial cross-sectional view of a bearing 400 that can be formed as described by the forming process above. It will be appreciated that the reference numbers, features, and characteristics of the individual components of the bearing 400 may be substantially similar to the corresponding components of the bearing 300 illustrated in FIGS. 3A-3B. In addition, in the embodiment shown in FIG. 4, the second region 428 may form a first section 428A and a second section 428B. The first section 428A of the second region 428 may be at a higher axial height than the second section 428B of the second region 428 relative to the first axial end 403 of the bearing 400. In an alternative embodiment, the first section 428A of the second region 428 may be at a lower axial height than the second section 428B of the second region 428 relative to the first axial end 403 of the bearing 400. A second stepped transition region 436 may be disposed between the first section 428A and the second section 428B of the second region 428. It should be contemplated that the second stepped transition region 436 may have all the range of lengths, thicknesses, and angles mentioned above regarding the stepped transition region 326 of FIGS. 3A-3B.

FIG. 5 illustrates a top perspective view of a bearing 500 that can be formed as described by the forming process above. It will be appreciated that the reference numbers, features, and characteristics of the individual components of the bearing 500 may be substantially similar to the corresponding components of the bearing 300 illustrated in FIGS. 3A-3B, and the corresponding components of the bearing 400 illustrated in FIG. 4. In an embodiment, as shown in FIG. 5, the second region 528 may extend at least partially circumferentially around the flange 522 to form at least one segment 542. In an embodiment, the at least one segment 542 may include a plurality of segments 542, 542', 542" with a plurality of stepped transition regions 526, 526', 526" such that each segment 542, 542', 542" may be adjacent a first region 524. Each of the plurality of segments 542, 542', 542" may each extend at least partially circumferentially around the flange 522. In other words, the stepped transition regions 526, 526', 526" may be oriented circumferentially such that the second regions 528 forms segments 542, 542', 542" adjacent a first region 524. The flange may include at least 3 stepped transition regions, such as at least 6 stepped transition regions (as shown), at least 8 stepped transition regions, or at least 10 stepped transition regions. In a number of embodiments, the segments in total may span less than 270° of a circumference of the flange, such as less than 225°, less than 180°, less than 135°, or less than 90°. It should be contemplated that the stepped transition regions 526, 526', 526" may have all the range of lengths, thicknesses, and angles mentioned above regarding the stepped transition region 326 of FIGS. 3A-3B.

In a number of embodiments, the bearing 300, 400, 500 may be including in an assembly 2000. The assembly 2000 may further include an inner member, such as a shaft 28. The assembly 2000 may include a bearing 300, 400, 500 surrounding the shaft 28, the bearing 300, 400, 500 having a body 310, 410, 510 having a first axial end 303, 403, 503 and a second axial end 305, 405, 505. The bearing 300, 400, 500 may further include forming at least one flange 322, 422, 522 on the second axial end 305, 405, 505 of the bearing 300, 400, 500, where at least one flange 322, 422, 522 projects radially from the second axial end 305, 405, 505 of the body 310, 410, 510, where the at least one flange 322, 422, 522 includes a first region 324, 424, 524, second region 328, 428, 528, and a stepped transition region 326, 426, 526 between the first region 324, 424, 524 and the second regions 328, 428, 528, where the second region 328, 428, 528 may be elevated axially above the first region 324, 424, 524 so as to protrude axially outwardly, where 1) the second region 328, 428, 528 extends partially circumferentially around the flange 322, 422, 522 to form at least one segment, and/or 2) the first region 324, 424, 524 extends from the body 310, 410, 510 to the stepped transition region 326, 426, 526 and defines a maximum first axial height, $h_{max1}$, defined as the distance from the first axial end 303, 403, 503 to the maximum height of the first region 324, 424, 524, and the second region 1328, 428, 528 extending from the stepped transition region 326, 426, 526 defines a second maximum axial height, $h_{max2}$, defined as the distance from the first axial end 303, 403, 503 to the maximum height of the second region 326, 426, 526, and where $h_{max1}<h_{max2}$. The assembly 2000 may further include outer member 30, such as a housing. In a number of embodiments, the bearing 300, 400, 500 may be disposed between the inner member 28 and the outer member 30 such that the bearing surrounds the inner member or shaft 28. In a number of embodiments, the stepped transition region 326, 426, 526 may allow axial tolerance compensation between the bearing 300, 400, 500 and at least one of the inner member 28 or the outer member 30. The stepped transition region 326, 426, 526 or resulting flange 322, 422, 522 may allow axial tolerance compensation of the inner member or shaft 28 of at least 0.1 mm and not greater than 5 mm.

Figure 6:
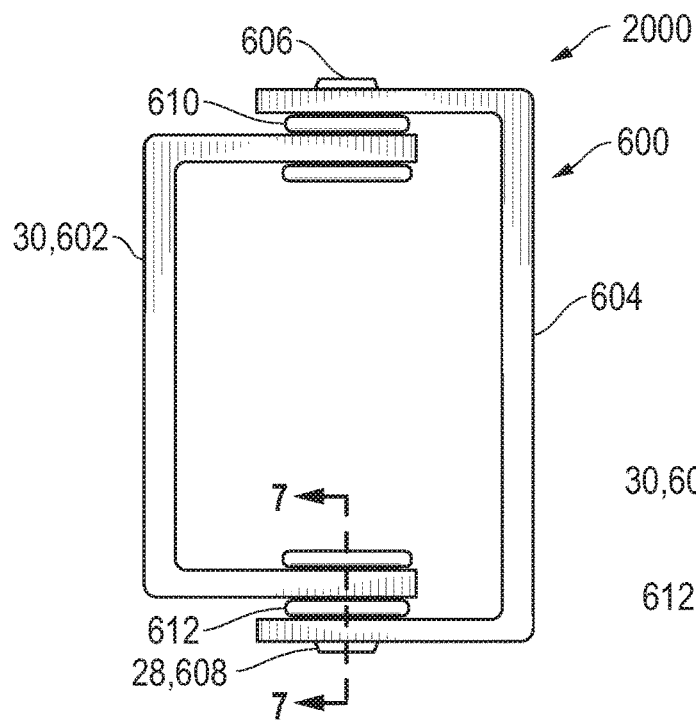
FIG. 6 is an illustration of a bearing within an assembly according to a number of embodiments.
Figure 7:
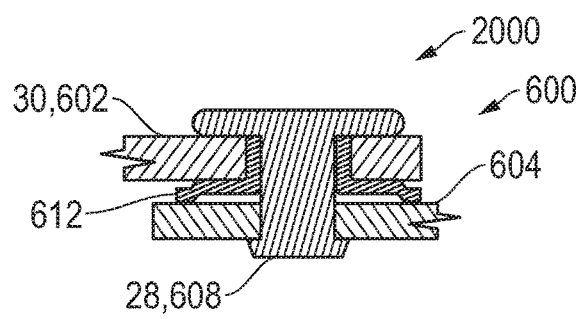
FIG. 7 is an illustration of a bearing within an assembly according to a number of embodiments.

FIGS. 6 and 7 illustrate an assembly 2000 in the form of an exemplary hinge 600, such as an automotive door hinge, hood hinge, engine compartment hinge, and the like. Hinge 600 can include an inner member 28 (such as an inner hinge region 602) and an outer hinge region 604. Hinge regions 602 and 604 can be joined by outer members 30 (such as rivets 606 and 608) and bearings 610 and 612. Bearings 610 and 612 can be bearings as previously described and labeled 300, 400, 500 herein. FIG. 7 illustrates a cross section of hinge 600, showing rivet 608 and bearing 612 in more detail.

FIG. 8 illustrates an assembly 2000 in the form of another exemplary hinge 800. Hinge 800 can include a first hinge region 802 and a second hinge region 804 joined by a pin 806 and a bearing 808. Bearing 808 can be a bearing as previously described and labeled 300, 400, 500 herein.

In an exemplary embodiment, FIG. 9 depicts a non-limiting example of an assembly 2000 in the form of an embodiment of another hinge assembly 900 including the parts of a disassembled automobile door hinge including bearing 904. FIG. 9 is an example of a profile hinge. The bearing 904 may be inserted in hinge door part 906. Bearing 904 can be a bearing as previously described and labeled 300, 400, 500 herein. Rivet 908 bridges the hinge door part 906 with hinge body part 910. Rivet 908 may be tightened with hinge body part 910 through set screw 912 and hold in place with the hinge door part 906 through washer 902.

FIG. 10 illustrates an assembly 2000 in the form of an exemplary headset assembly 10000 for a two-wheeled vehicle, such as a bicycle or motorcycle. A steering tube 1002 can be inserted through a head tube 1004. Bearings 1006 and 1008 can be placed between the steering tube 1002 and the head tube 1004 to maintain alignment and prevent contact between the steering tube 1002 and the head tube 1004. Bearings 1006 and 1008 can be bearings as previously described and labeled 300, 400, 500 herein. Additionally, seals 1010 and 1012 can prevent contamination of the sliding surface of the bearing by dirt and other particulate matter.

Such assemblies noted above are all exemplary and are not meant to limit the use of the bearing 300, 400, 500 in potential other assemblies. For example, the bearing 300, 400, 500 may be used in an assembly 2000 for a powertrain assembly application (such as belt tensioners) or other assembly applications with limited space.

In an embodiment, the bearing 300, 400, 500 can provide an axial tolerance compensation of at least 0.1 mm in an axial direction relative to the inner member or outer member, such as at least 0.2 mm, at least 0.3 mm, at least 0.5 mm, at least 1 mm, at least 2 mm, or even at least 5 mm. In a further embodiment, the assembly 2000 can be installed or assembled by an assembly force of no greater than 10,000 N in the axial direction to the inner member or outer member, such as no greater than 5,000 N, no greater than 1,000 N, no greater than 500 N, no greater than 100 N, no greater than 50 or even no greater than 10 N.

The method of forming the bearing 300, 400, 500 may include providing a blank. The bearing 300, 400, 500 may be formed from a blank including a laminate including a substrate 1119 and a low friction layer 1104 overlying the substrate 1119. The method may further include forming a bearing 300, 400, 500 from the blank, the bearing having a body 310 having a first axial end 303 and a second axial end 305. The method may further include forming at least one flange 322 on the second axial end 305 of the bearing 300, where at least one flange 322 projects radially from the second axial end 305 of the body 310, where the at least one flange 322 includes a first region 324, second region 328, and a stepped transition region 326 between the first and second regions 324, 326, where the second region 328 may be elevated axially above the first region 324 so as to protrude axially outwardly, where 1) the second region 328 extends partially circumferentially around the flange 322 to form at least one segment, and/or 2) the first region 324 extends from the body 310 to the stepped transition region 326 and defines a maximum first axial height, $h_{max1}$, defined as the distance from the first axial end 303 to the maximum height of the first region 324, and the second region 328 extending from the stepped transition region 326 defines a second maximum axial height, $h_{max2}$, defined as the distance from the first axial end 303 to the maximum height of the second region 326, and where $h_{max1}<h_{max2}$.

Applications for such embodiments include, for example, assemblies 1000 for hinges and other vehicle components. Further, use of the bearing 300, 400, 500 or assembly 2000 may provide increased benefits in several applications such as, but not limited to, vehicle tail gates, door frames, seat assemblies, powertrain applications (such as belt tensioners), or other types of applications. According to embodiments herein, the flanges of the bearings may provide desired axial preload and improved axial tolerance compensation compared to existing bearings known in the art. Further, according to embodiments herein, the bearings may be a simple installation and be retrofit and cost effective across several possible assemblies of varying complexity. As a result, these designs can significantly reduce noise, harshness, and vibration properties while providing improved torque performance, thereby increasing lifetime and improving effectiveness and performance of the assembly, the bearing, and its other components.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A bearing, comprising: a body having a first axial end and a second axial end; and at least one flange projecting radially from the second axial end of the body, wherein the at least one flange comprises a first region, second region, and a stepped transition region between the first and second regions, wherein the second region is elevated axially above the first region so as to protrude axially outwardly, wherein 1) the second region extends partially circumferentially around the flange to form at least one segment, and/or 2) the first region extends from the body to the stepped transition region and defines a maximum first axial height, $h_{max1}$, defined as the distance from the first axial end to the maximum height of the first region, and the second region extending from the stepped transition region defines a second maximum axial height, $h_{max2}$, defined as the distance from the first axial end to the maximum height of the second region, and wherein $h_{max1} < h_{max2}$.

Embodiment 2

An assembly comprising: a shaft; and a bearing surrounding the shaft, wherein the bearing comprises: a body having a first axial end and a second axial end; and at least one flange projecting radially from the second axial end of the body, wherein the at least one flange comprises a first region, second region, and a stepped transition region between the first and second regions, wherein the second region is elevated axially above the first region so as to protrude axially outwardly, wherein 1) the second region extends partially circumferentially around the flange to form at least one segment, 2) the first region extends from the body to the stepped transition region and defines a maximum first axial height, $h_{max1}$, defined as the distance from the first axial end to the maximum height of the first region, and the second region extending from the stepped transition region defines a second maximum axial height, $h_{max2}$, defined as the distance from the first axial end to the maximum height of the second region, and wherein $h_{max1} < h_{max2}$.

Embodiment 3

A method for forming a bearing, comprising: providing a blank; forming a bearing from the blank, the bearing comprising a body having a first axial end and a second axial end; and forming at least one flange on the second axial end of the bearing, wherein at least one flange projects radially from the second axial end of the body, wherein the at least one flange comprises a first region, second region, and a stepped transition region between the first and second regions, wherein the second region is elevated axially above the first region so as to protrude axially outwardly, wherein 1) the second region extends partially circumferentially around the flange to form at least one segment, and/or 2) the first region extends from the body to the stepped transition region and defines a maximum first axial height, $h_{max1}$, defined as the distance from the first axial end to the maximum height of the first region, and the second region extending from the stepped transition region defines a second maximum axial height, $h_{max2}$, defined as the distance from the first axial end to the maximum height of the second region, and wherein $h_{max1} < h_{max2}$.

Embodiment 4

The bearing, assembly, or method of any of the preceding embodiments, wherein the at least one segment of the second region comprises a plurality of segments.

Embodiment 5

The bearing, assembly, or method of any of the preceding embodiments, wherein the stepped transition region extends circumferentially such that the second region forms a segment adjacent the first region.

Embodiment 6

The bearing, assembly, or method of embodiment 4, wherein the plurality of segments includes at least 3 segments.

Embodiment 7

The bearing, assembly, or method of any of the preceding embodiments, wherein the flange comprises at least 3 stepped transition regions, such as at least 6 stepped transition regions, at least 8 stepped transition regions, or at least 10 stepped transition regions.

Embodiment 8

The bearing, assembly, or method of embodiment 4, wherein the plurality of segments spans less than 270° of a circumference of the flange, such as less than 225°, less than 180°, less than 135°, or less than 90°.

Embodiment 9

The bearing, assembly, or method of any of the preceding embodiments, wherein $h_{max1} \leq 0.99\ h_{max2}$, such as $h_{max1} \leq 0.95\ h_{max2}$, or $h_{max1} \leq 0.90\ h_{max2}$.

Embodiment 10

The bearing, assembly, or method of any of the preceding embodiments, wherein the stepped transition region has a height, $h_{step}$, of 0.05 mm to 5 mm.

Embodiment 11

The bearing, assembly, or method of any of the preceding embodiments, wherein the flange has a surface area, $SA_F$, and the second region extends less than 80% of the surface area, $SA_F$, of the flange.

Embodiment 12

The bearing, assembly, or method of any of the preceding embodiments, wherein the stepped transition region is annular.

Embodiment 13

The bearing, assembly, or method of any of the preceding embodiments, wherein the second region is adapted to at least partially axially deform so as to provide axial tolerance compensation.

Embodiment 14

The bearing, assembly, or method of any of the preceding embodiments, wherein, as viewed in radial cross-section, the first region has a radial length, $L_{FR}$, and second region has radial length, $L_{SR}$, where, $L_{FR} > L_{SR}$.

Embodiment 15

The bearing, assembly, or method of any of the preceding embodiments, wherein the second region provides a load capacity of 10 to 90% of the load capacity of a flange without stepped transition region.

Embodiment 16

The bearing, assembly, or method of any of the preceding embodiments, wherein the stepped transition region forms an inclined angle θ relative to a line parallel to the central axis, wherein the inclined angle θ is in a range from at least 30 degrees to 90 degrees.

Embodiment 17

The bearing, assembly, or method of any of the preceding embodiments, wherein the stepped portion extends a total thickness of the flange in axial direction by at least 5% and not greater than 40%, based on a thickness of the flange.

Embodiment 18

The bearing, assembly, or method of any of the preceding embodiments, wherein the bearing comprises an axial gap.

Embodiment 19

The bearing, assembly, or method of any of the preceding embodiments, wherein an inner radius of the bearing is at least 2.5 mm and not greater than 20 mm.

Embodiment 20

The bearing, assembly, or method of any of the preceding embodiments, wherein an outer radius of the bearing is at least 5 mm and not greater than 25 mm.

Embodiment 21

The bearing, assembly, or method of any of the preceding embodiments, wherein the bearing comprises a laminate comprising a substrate and a low friction layer.

Embodiment 22

The bearing, assembly, or method of embodiment 21, wherein the low friction layer comprises a polymer.

Embodiment 23

The bearing, assembly, or method of embodiment 22, wherein the polymer of the low friction layer comprises a fluoropolymer.

Embodiment 24

The bearing, assembly, or method of embodiment 21, wherein the substrate includes a metal.

Embodiment 25

The bearing, assembly, or method of embodiment 24, wherein the metal of the substrate is selected from the group of iron, aluminum, copper, nickel, or alloys thereof.

Embodiment 26

The bearing, assembly, or method of any of the preceding embodiments, wherein a thickness of the low friction layer is at least 1 micron and not greater than 500 microns.

Embodiment 27

The bearing, assembly, or method of any of the preceding embodiments, wherein a thickness of the substrate is at least 50 microns and not greater than 500 microns.

Embodiment 28

The bearing, assembly, or method of any of the preceding embodiments, wherein the flange is segmented.

Note that not all of the features described above are required, that a region of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, however, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A bearing, comprising:
    a body having a first axial end and a second axial end; and
    at least one flange projecting radially from the second axial end of the body, wherein the at least one flange comprises a first region, second region, and a stepped transition region between the first and second regions, wherein the second region is elevated axially above the first region so as to protrude axially outwardly, wherein 1) the second region extends partially circumferentially around the flange to form at least one segment, and/or 2) the first region extends from the body to the stepped transition region and defines a maximum first axial height, $h_{max1}$, defined as the distance from the first axial end to the maximum height of the first region, and the second region extending from the stepped transition region defines a second maximum axial height, $h_{max2}$, defined as the distance from the first axial end to the maximum height of the second region, and wherein $h_{max1} < 0.99\, h_{max2}$.

2. The bearing of claim 1, wherein the at least one segment of the second region comprises a plurality of segments.

3. The bearing of claim 2, wherein the plurality of segments includes at least 3 segments.

4. The bearing of claim 1, wherein the stepped transition region extends circumferentially such that the second region forms a segment adjacent the first region.

5. The bearing of claim 1, wherein the flange comprises at least 3 stepped transition regions.

6. The bearing of claim 1, wherein the plurality of segments spans less than 270° of a circumference of the flange.

7. The bearing of claim 1, wherein the stepped transition region has a height, $h_{step}$, of 0.05 mm to 5 mm.

8. The bearing of claim 1, wherein the flange has a surface area, $SA_F$, and the second region extends less than 80% of the surface area, $SA_F$, of the flange.

9. The bearing of claim 1, wherein the stepped transition region is annular.

10. The bearing of claim 1, wherein, as viewed in radial cross-section, the first region has a radial length, $L_{FR}$, and second region has radial length, $L_{SR}$, where, $L_{FR} > L_{SR}$.

11. The bearing of claim 1, wherein the flange is segmented.

12. The bearing of claim 1, wherein the stepped transition region forms an inclined angle θ relative to a line parallel to the central axis, wherein the inclined angle θ is in a range from at least 30 degrees to 90 degrees.

13. The bearing of claim 1, wherein the stepped portion extends a total thickness of the flange in axial direction by at least 5% and not greater than 40%, based on a thickness of the flange.

14. The bearing of claim 1, wherein the bearing comprises an axial gap.

15. The bearing of claim 1, wherein the bearing comprises a laminate comprising a substrate and a low friction layer.

16. The bearing of claim 15, wherein the low friction layer comprises a polymer.

17. An assembly comprising:
a shaft; and
a bearing surrounding the shaft, wherein the bearing comprises:
   a body having a first axial end and a second axial end; and
   at least one flange projecting radially from the second axial end of the body, wherein the at least one flange comprises a first region, second region, and a stepped transition region between the first and second regions, wherein the second region is elevated axially above the first region so as to protrude axially outwardly, wherein 1) the second region extends partially circumferentially around the flange to form at least one segment, and/or 2) the first region extends from the body to the stepped transition region and defines a maximum first axial height, $h_{max1}$, defined as the distance from the first axial end to the maximum height of the first region, and the second region extending from the stepped transition region defines a second maximum axial height, $h_{max2}$, defined as the distance from the first axial end to the maximum height of the second region and wherein, $h_{max1} < 0.99\ h_{max2}$.

18. The assembly of claim 17, wherein the second region is adapted to at least partially axially deform so as to provide axial tolerance compensation.

19. A method for forming a bearing, comprising:

providing a blank;

forming a bearing from the blank, the bearing comprising a body having a first axial end and a second axial end; and forming at least one flange on the second axial end of the bearing, wherein at least one flange projects radially from the second axial end of the body, wherein the at least one flange comprises a first region, second region, and a stepped transition region between the first and second regions, wherein the second region is elevated axially above the first region so as to protrude axially outwardly, wherein 1) the second region extends partially circumferentially around the flange to form at least one segment, and/or 2) the first region extends from the body to the stepped transition region and defines a maximum first axial height, $h_{max1}$, defined as the distance from the first axial end to the maximum height of the first region, and the second region extending from the stepped transition region defines a second maximum axial height, $h_{max2}$, defined as the distance from the first axial end to the maximum height of the second region, and wherein $h_{max1} < 0.99\ h_{max2}$.

* * * * *